(12) United States Patent
Ogishi et al.

(10) Patent No.: US 7,239,701 B1
(45) Date of Patent: Jul. 3, 2007

(54) KEY SHARING METHOD, SECRET KEY GENERATING METHOD, COMMON KEY GENERATING METHOD AND CRYPTOGRAPHIC COMMUNICATION METHOD IN ID-NIKS CRYPTOSYSTEM

(75) Inventors: Kiyoshi Ogishi, Kyoto (JP); Ryuichi Sakai, Kyoto (JP); Masao Kasahara, Mino (JP)

(73) Assignees: Murata Machinery Ltd., Kyoto (JP); Masao Kasahara, Osaka (JP); Ryuichi Sakai, Kyoto (JP)

( * ) Notice: Subject to any disclaimer, the term of this patent is extended or adjusted under 35 U.S.C. 154(b) by 704 days.

(21) Appl. No.: 09/708,263

(22) Filed: Nov. 7, 2000

(30) Foreign Application Priority Data

May 2, 2000 (JP) ............................. 2000-133471

(51) Int. Cl.
 *G06F 17/00* (2006.01)
 *H04L 9/00* (2006.01)
(52) U.S. Cl. .............................. 380/44; 380/46; 380/28
(58) Field of Classification Search ................ 380/277, 380/278, 279, 285, 44–46, 28; 713/200, 713/201
See application file for complete search history.

(56) References Cited

U.S. PATENT DOCUMENTS 5,016,276 A    5/1991  Matumoto et al.
5,272,755 A *  12/1993 Miyaji et al. .................. 380/30

FOREIGN PATENT DOCUMENTS

JP    11-317733    11/1999

OTHER PUBLICATIONS

Bruce Schneier, 1996, John Wiley & Sons, Inc., "Applied Cryptography", 480 and 115.*
Hatsukazu Tanaka, 1994, "Security Certified Identity-Based Non-Interactive Key Sharing", IEEE.*
Improving the stability of algebraic curves for applications; Tasdizen, T.; Tarel, J.-P.; Cooper, D.B.; Image Processing, IEEE Transactions on vol. 9, Issue 3, Mar. 2000 Page(s):405-416.*
Algebraic curves that work better; Tasdizen, T.; Tarel, J.-P.; Cooper, D.B.; Computer Vision and Pattern Recognition, 1999. IEEE Computer Society Conference on. vol. 2, Jun. 23-25, 1999 Page(s): 35-41.*
Algegraic curve fitting for multidimensional data with exact squares distance; Mizuta, M.; Systems, Man, and Cybernetics, 1996., IEEE International Conference on vol. 1, Oct. 14-17, 1996 Page(s):516-521 vol. 1.*

(Continued)

*Primary Examiner*—David Jung
(74) *Attorney, Agent, or Firm*—Hogan & Hartson LLP

(57) ABSTRACT

Mapping is carried out at a point on an elliptic curve to be utilized for elliptic encryption based on identity information (ID information) of each entity and a mapping value is set to be a public key of the entity. By using the mapping value and secret information, a secret key of each entity is generated. The entity generates a common key to be used for an encrypting process and a decrypting process by utilizing the self-secret key and the public key to be the mapping value obtained by mapping at a point on the elliptic curve based on ID information of a communication participate. In this case, pairing on the elliptic curve is utilized.

23 Claims, 4 Drawing Sheets

OTHER PUBLICATIONS

Efficient ID-KEM based on the Sakai-Kasahara key construction Chen, L.; Cheng, Z.; Malone-Lee, J.; Smart, N.P.; Information Security, IEEE Proceedings vol. 153, Issue 1, Mar. 2006 pp.: 19-26.*

Joseph H. Silverman, "The Arithmetic of Elliptic Curves", Springer-Verlag, 1986, pp. 94-99.

Okamoto, et al., "Cipher/Zero Knowledge Proof/Number Theory", edited by Information Processing Society of Japan, Kyoritsu Suppan, 1995, pp. 185-197.

Menezes, et al., "Reducing Elliptic Curve Logarithms to Logarithms in a Finite Field", IEEE Trans. Inf. Theory 39, pp. 1630-1646, 1993.

Kanayama, et al., "An Implementation of the MOV Reduction and the FR Reduction", SCIS '99, No. fl-1.4, Jan. 1999, pp. 791-793.

Blake, et al., "Elliptic Curves in Cryptography", London Mathematical Society Lecture Note Series 265. Cambridge University Press, 1999, pp. 42-45, pp. 79-89.

Harazawa, et al., "Comparing the MOV and FR Reductions in Elliptic Curve Cryptography", vol. J82-A No. 8, pp. 1278-1290.

M. Kasahara, "Key Sharing System Based on the ID Information", vol. 47, No. 2.pp. 141-145, Feb. 1993.

Matsumoto, et al., "On the Key Predistribution System: A Practical Solution to the Key Distribution Problem", Proceeding of Crypto'87, pp. 340-349, 1987.

H. Tanaka, "A Realization Scheme for the Identity-Based Cryptosystem", Proceeding of Crypto'87, pp. 340-349, 1987.

S. Tsujii, "An ID-Based Cryptosystem Based on the Discrete Logarithm Problem", IEEE Journal on Selected Areas in Communications, vol. 7, No. 4, 1989, pp. 467-473.

S. Lang, "Elliptic Curves Diophantine Analysis", Department of Mathematics, Yale University, Springer-Verlag. GTM112, 1978.

N. Koblitz, "Elliptic Curve Cryptosystems", Math. Comp. vol. 48. pp. 203-209. 1987.

V. Miller, "Use of Elliptic Curves in Cryptography", Crypto85, pp. 417-426. 1985.

J.A. Solinas, "An Improved Algorithm for Arithmetic on a Family of Elliptic Curves", Crypto97, pp. 357-371, 1997.

D. Bailey, et al., "Optimal Extension Fields for Fast Arithmetic in Public-Key Algorithms", Crypto'98, pp. 472-485. 1998.

H. Cohen, et al., "Efficient Elliptic Curve Exponentiation Using Mixed Coordinates", AsiaCrypto'98, pp. 51-65, 1998.

Ohgishi, et al., "Elliptic Curve Signature Scheme With No y Coordinate", SCIS'99, pp. 51-65, 1998.

Satoh, et al., "Fermat Quotients and the Polynomial Time Discrete Log Algorithm for Anomalous Elliptic Curves", Comm. Math. Univ. Sancti Pauli, vol. 47, pp. 81-92, 1998.

N.P. Smart, "The Discrete Logarithm Problem on Elliptic Curves of Trace One", Journal of Cryptology, 1999, pp. 193-196.

I.A. Semaev, Evaluation of Discrete Logarithms In A Group of p-Torsion Points of An Elliptic Curve in Characteristic p, Math. Comp. vol. 67, pp. 353-356, 1998.

Frey, et al., "A Remark Concerning m-Divisibility and The Discrete Logarithm in the Divisor Class Group of Curves", Math. Comp. vol. 62, pp. 865-874, 1994.

R. Schoof, Elliptic Curves Over Finite Fields and the Computation of Square Roots Mod p Math. Comp. vol. 44, pp. 482-494, 1985.

F. Morain, "Building Cyclic Elliptic Curves Modulo Large Primes", EuroCrypt'91, pp. 328-336, 1991.

Rolf Blom, "Non-Public Key Distribution", edited by David Chaum, Ronald L. Rivest and Alan T. Sherman, New York: Plenum Press, pp. 231-236.

Adi Shamir, "Identify-Based Cryptosystem and Signature Schemes", Deaprtment of Applied Mathematics, Springer Verlag, pp. 47-53.

Ryuichi Sakai, " *Elliptic Curve Cryptosystems*", (pp. 33-40), FAIT (Forum on Advanced Information Technology), Kyoto Institute of Technology, Mar. 2000 and English language translation (pp. 1-24).

Antonie Joux, "*A One Round Protocol for Tripartite Diffie-Hellman*", W. Bosma (Ed.): ANTS-IV, LNCS 1838, pp. 385-393, Jul. 2000.

R. Balasubramanian, et al., "*The Improbabilty That an Elliptic Curve Has Subexponential Discrete Log Problem under the Menezes-Okamoto-Vanstone Algorithm*", J. Cryptology (1998) 11: pp. 141-145.

Yasuyuki Murakami, et al., "*A New Probablistic ID-Based Non-interactive Key Sharing Scheme*", IEICE TRANS. Fundamentals, vol. E83-A, No. 1, Jan. 2000.

Ryuichi Sakai, et al., "*A New Class of Non-Interactive ID-Based Key Sharing Schemes and its Performances*", IEICE TRANS. Fundamentals, vol. E78-A, No. 1, Jan. 1995.

Yoshida, et al., "Some Cryptosystems on Elliptic Curves" IEEE, vol. 92, No. 499, Mar. 15, pp. 37-45.

Ryuichi Sakai, et al. "Cryptosystems Based on Pairing" Institute of Electronics Information and Communication Engineers, Technical Research Report, Mar. 1993, ISEC 92-68, pp. 37-45 (English and Japanese version).

* cited by examiner

KEY SHARING METHOD, SECRET KEY GENERATING METHOD, COMMON KEY GENERATING METHOD AND CRYPTOGRAPHIC COMMUNICATION METHOD IN ID-NIKS CRYPTOSYSTEM

BACKGROUND OF THE INVENTION

The present invention relates to a key sharing method for sharing a common key between both entities without a preliminary communication, a secret key generating method and device for generating a secret key of each entity in a center, a common key generating method and device for generating a common key necessary for an encrypting process and a decrypting process on each entity side, a cryptographic communication method and system for carrying out a communication by using a ciphertext such that people other than a concerned participant cannot know the contents of information, and a memory product/data signal embodied in carrier wave for recording/transmitting operation programs for these methods.

In the modern society, called a highly information-oriented society, based on a computer network, important business documents and image information are transmitted and communicated in a form of electronic information. Such electronic information cab be easily copied, so that it tends to be difficult to discriminate its copy and original from each other, thus bringing about an important issue of data integrity. In particular, it is indispensable for establishment of a highly information oriented society to implement such a computer network that meets the factors of "sharing of computer resources," "multi-accessing," and "globalization," which however includes various factors contradicting the problem of data integrity among the parties concerned. In an attempt to eliminate those contradictions, encrypting technologies which have been mainly used in the past military and diplomatic fields in the human history are attracting world attention as an effective method for that purpose.

A cipher is defined as exchanging information in such a manner that no one other than the participants can understand the meaning of the information. In the field of ciphers, encryption is defined as converting an original text (plaintext) that can be understood by anyone into a text (ciphertext) that cannot be understood by the third party and decryption is defined as restoring a ciphertext into a plaintext, and cryptosystem is defined as the overall processes covering both encryption and decryption. The encrypting and decrypting processes use secret information called an encryption key and a decryption key, respectively. Since the secret decryption key is necessary in decryption, only those knowing this decryption key can decrypt ciphertexts, thus maintaining data security.

The encryption key and the decryption key may be either the same or different from each other. A cryptosystem using the same key is called a common-key cryptosystem, and DES (Data Encryption Standards) employed by the Standard Agency of the USA Commerce Ministry is a typical example. As an example of the cryptosystem using the keys different from each other, a cryptosystem called a public-key cryptosystem has been proposed. In the public-key cryptosystem, each user (entity) utilizing this cryptosystem generates a pair of encryption and decryption keys and publicizes the encryption key in a public key list, thereby keeping only the decryption key in secret. In this public-key cryptosystem, the paired encryption and decryption keys are different from each other, so that the public-key cryptosystem has a feature that the decryption key cannot be known from the encryption key with a one-way function.

The public-key cryptosystem is a breakthrough in cryptosystem which publicizes the encryption key and meets the above-mentioned three factors required for establishing highly information-oriented society, so that it has been studied actively for its application in the field of information communication technologies, thus leading RSA cryptosystem being proposed as a typical public-key cryptosystem. This RSA cryptosystem has been implemented by utilizing the difficulty of factorization into prime factors as the one-way function. Also, a variety of other public-key cryptosystems have been proposed that utilize the difficulty of solving discrete logarithm problems.

Besides, a cryptosystem has been proposed that utilizes ID (identity) information identifying individuals, such as post address, name and electronic mail address of each entity. This cryptosystem generates an encryption/decryption key common to a sender and a receiver based on ID information. Besides, the following ID-information based cryptosystems are provided: (1) a technique which needs a preliminary communication between the sender and the receiver prior to a ciphertext communication and (2) a technique which does not need a preliminary communication between the sender and the receiver prior to a ciphertext communication. The technique (2), in particular, does not need a preliminary communication, so that its entities are very convenient in use, thus considered as a nucleus for the future cryptosystems.

A cryptosystem according to this technique (2) is called ID-NIKS (ID-based non-interactive key sharing scheme), whereby sharing an encryption key without a preliminary communication is enabled by employing ID information of a communication partner. The ID-NIKS needs not exchange a public key or a secret key between a sender and a receiver nor receive a key list or services from third parties, thus securing safe communications between any given entities.

FIG. 1 shows principles for this ID-NIKS system. This system assumes the presence of a reliable center, around which a common-key generation system is configured. In FIG. 1, the information specific to an entity X, i.e. its ID information of a name, a post address, a telephone number, an e-mail address, etc. is represented by $h(ID_x)$ using a hash function $h(\cdot)$. For an any given entity X, the center calculates secret information $S_{xi}$ as follows on the basis of center public information $\{PC_i\}$ center secret information $\{SC_i\}$ and ID information $h(ID_x)$ of the entity X, and sends it to the entity X secretly:

$$S_{xi} = F_i(\{SC_i\}, \{PC_i\}, h(ID_x))$$

The entity X generates, for communications between itself and another arbitrary entity Y, a common key $K_{XY}$ for encryption and decryption with its own secret $\{S_{xi}\}$, center public information $\{PC_i\}$ and entity Y's ID information $h(ID_Y)$ of the partner entity Y as follows:

$$K_{XY} = f(\{S_{xi}\}, \{PC_i\}, h(ID_Y))$$

The entity Y also generates a common key $K_{YX}$ for the entity X similarly. If a relationship of $K_{XY} = K_{YX}$ holds true always, these keys $K_{XY}$ and $K_{YX}$ can be used as the encryption and decryption keys between the entities X and Y.

In the above-mentioned public-key cryptosystem, for example, an RSA cryptosystem, its public key measures 10-fold and more as long as the presently used telephone number, thus being very troublesome. To guard against this, in the ID-NIKS, each ID information can be registered in a form of name list to thereby be referenced in generating a common key used between any given entities. Therefore, by safely implementing such an ID-NIKS system as shown in FIG. 1, a convenient cryptosystem can be installed over a computer network to which a lot of entities are subscribed. For these reasons, the ID-NIKS is expected to constitute a core of the future cryptosystem.

In an ID-NIKS sharing a common key to act as an encryption key and a decryption key each other without performing a preliminary communication using the ID information of a communication partner, particularly, it is desirable that sufficient safety should be maintained against a collusion attack in which a plurality of entities collude. Whether a cryptological safe ID-NIKS can be constructed or not is an important problem for an advanced computerization society and an ideal crypto scheme has been researched.

BRIEF SUMMARY OF THE INVENTION

It is an object of the present invention to provide a key sharing method for easily sharing a common key between both entities without a preliminary communication by mapping at a point on an algebraic curve such as an elliptic curve utilized for elliptic cipher based on identity information (ID information) of each entity, a secret key generating method and device, a common key generating method and device, a cryptographic communication method and system for constructing a safety ID-NIKS based on the key sharing method, and a memory product/data signal embodied in carrier wave for recording/transmitting operation programs for these methods.

In the present invention, mapping is carried out at a point on an algebraic curve such as an elliptic curve or a hyper-elliptic curve which is utilized for elliptic cipher based on the identity information (ID information) of each entity and the mapping value is set to be a public key of each entity. The algebraic curve and a mapping algorithm are open to the public. In a center, mapping is carried out at a point on the algebraic curve based on the identity information (ID information) of each entity, and a secret key of the entity is generated by using the mapping value and secret information of the center itself and is sent to the corresponding entity in secret. Each entity generates a common key to be used for an encrypting process and a decrypting process by utilizing the self-secret key sent from the center and the mapping value obtained by mapping at a point on the algebraic curve based on the identity information (ID information) of a communication partner. In this case, the same common key is shared between both entities without performing a preliminary communication by utilizing paring (Weil pairing, Tate pairing or the like) defined on the algebraic curve. The mapping at a point on the algebraic curve in the present invention can be carried out for each entity and the center.

In the present invention, safety is based on a discrete logarithm problem on the algebraic curve (for example, a discrete logarithm problem on an elliptic curve which will be hereinafter referred to as an elliptic discrete logarithm problem). A cryptosystem according to the present invention is broken due to a collusion attack of a plurality of entities equivalently to the solution of the elliptic discrete logarithm problem or with more difficulty, for example. Thus, very high safety can be obtained.

The above and further objects and features of the invention will more fully be apparent from the following detailed description with accompanying drawings.

DETAILED DESCRIPTION OF THE INVENTION

Embodiments of the present invention will be described specifically.

Figure 1:
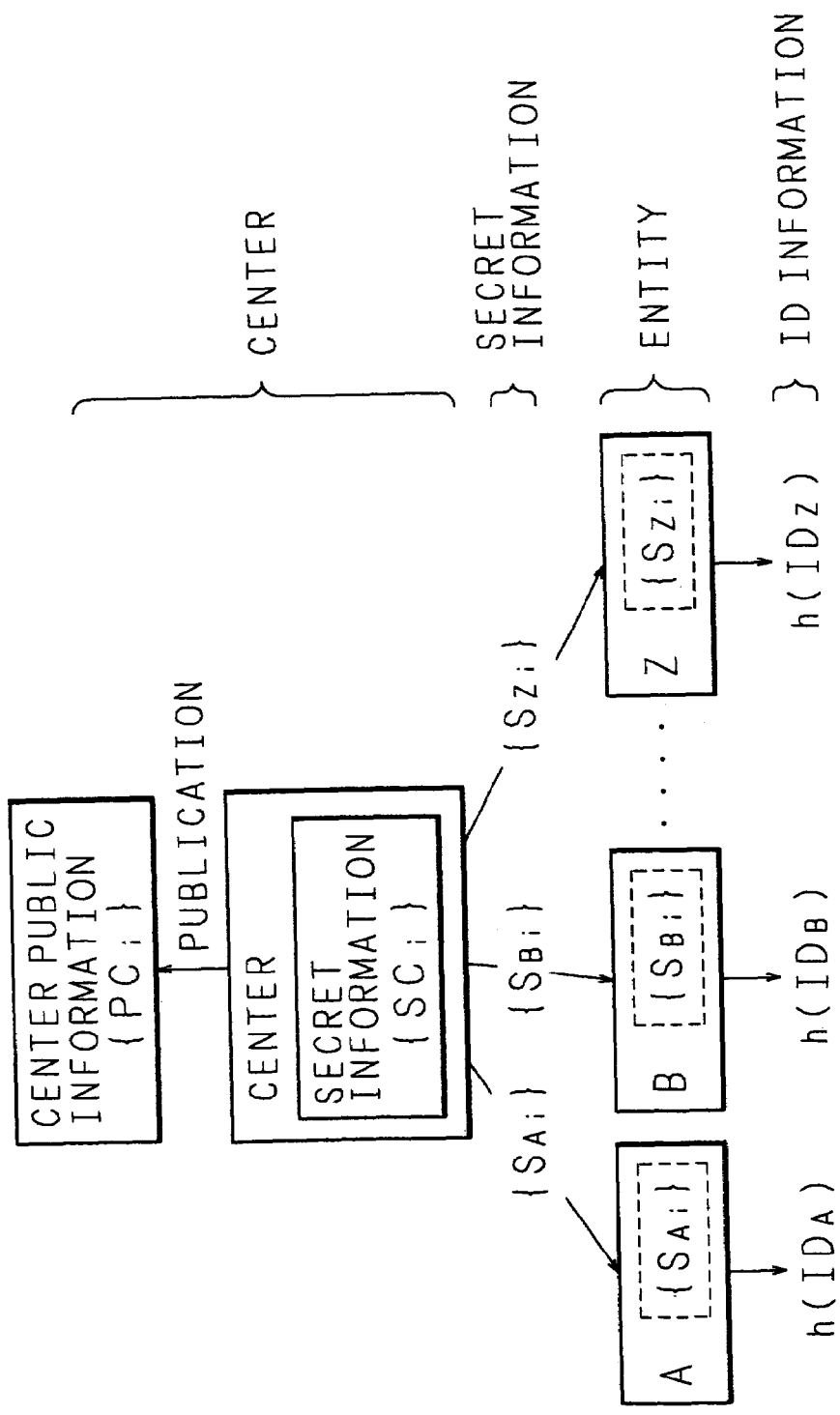
FIG. 1 is a diagram showing the structure of a principle of an ID-NIKS system.
Figure 2:
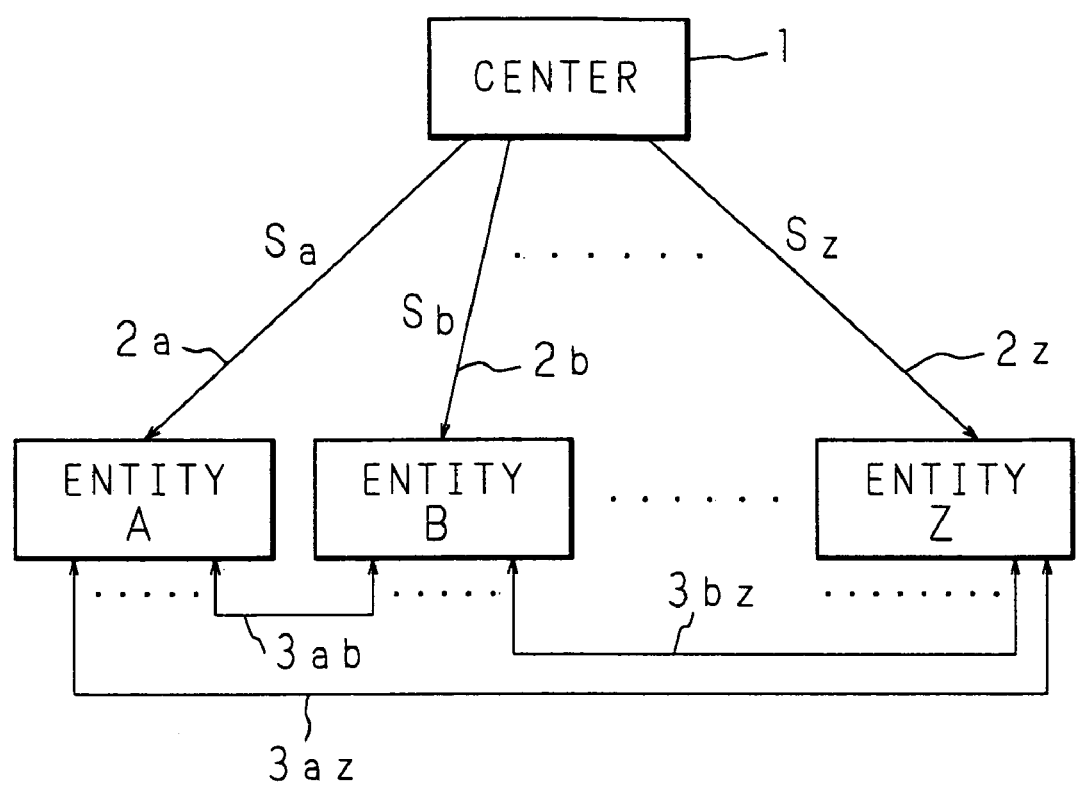
FIG. 2 is a diagram typically showing the structure of a cryptographic communication system according to the present invention.

FIG. 2 is a diagram typically showing the structure of a cryptographic communication system according to the present invention. A center 1 which can reliably conceal information is set. For example, a social public organization can correspond to the center 1. The center 1 and a plurality of entities A, B, . . . , Z to be users utilizing the cryptographic communication system are connected through secret communication passages $2a$, $2b$, . . . , $2z$, and secret key information (secret keys $S_a$, $S_b$, . . . , $S_z$) are sent from the center 1 to the entities A, B, . . . , Z through the secret communication passages $2a$, $2b$, . . . , $2z$. Moreover, communication passages $3ab$, $3az$, $3bz$, . . . are provided between two entities, and a ciphertext obtained by encrypting communication information is transmitted between the entities through the communication passages $3ab$, $3az$, $3bz$, . . . .

Next, description will be given to a basic system according to the present invention in which an elliptic curve is used as an algebraic curve.

First of all, the basic property of Weil pairing of the elliptic curve used in the present invention will be described. The Weil pairing implies mapping on a multiplicative group of a finite field $F_d$ ($d=q^k$) from a group $E/F_q$ formed by points on the elliptic curve. In the Weil pairing, a bilinear property and a commutative law are established in the following manner. $<, >$ represents the Weil pairing, and P, $P_1$, $P_2$, Q, $Q_1$ and $Q_2$ represent points on the elliptic curve.

(Bilinear Property)<

$$<P_1+P_2, Q> = <P_1, Q><P_2, Q>$$

$$<P, Q_1+Q_2> = <P, Q_1><P, Q_2>$$

(Commutative Law)<

$$<P, Q> = <Q, P>^{-1}$$

There is a bilinear property. Accordingly, if m is an integer, the following equality is established.

$$<mP, Q> = <P, Q>^m$$

$$<P, mQ> = <P, Q>^m$$

A key sharing method based on the Weil pairing will be described below.

(Secret Key Generation in Center 1)

Identity information (ID information) of an optional entity A, for example, a name, a post address, a telephone number, an e-mail address and the like is set to be $ID_a$. The center 1 opens, to the public, the algorithm $<, >$ of the Weil pairing and a function f( ) for converting (mapping) the ID information $ID_a$ of the optional entity. A into a point $P_a \in E/F_q$ on the elliptic curve to obtain a public key. Moreover, the center 1 generates a secret random number r. By using the random number r and the public key $P_a$ of the entity A, a secret key $S_a$ of the entity A is obtained in the following equation (1). The secret key $S_a$ thus obtained is distributed to the entity A in secret.

$$S_a = rPa \qquad \ldots (1)$$

The above-mentioned secret information and public information can be collected as follows.
Public information of center 1: $<,>f()$
Secret information of center 1: r(random integer)
Public key of entity A: $P_a(=f(ID_a))$
Secret key of entity A: $S_a(=r \cdot f(ID_a))$ (Generation of Common Key in Entity A, B)

Each entity generates a common key by utilizing the Weil pairing on the elliptic curve based on a self-secret key distributed from the center 1 and a public key of the entity to be a communication partner.

FIRST EXAMPLE

An algorithm for comparing in size the ID information $ID_a$ of the entity A with the ID information $ID_b$ of the entity B is set and the order of the pairing is properly set by using information about the comparison in size when the pairing is to be calculated. As the algorithm, the comparison in size by a lexicographic expression or binary can be used. As a method for setting the order of the pairing, it is also possible to use information about the comparison in size of the public keys $P_a$ and $P_b$ which are obtained after converting (mapping) the ID information $ID_a$ and $ID_b$.

For example, if $ID_a > ID_b$ is set, the entity A generates a common key $K_{ab}$ in accordance with the following equation (2) by using the self-secret key $S_a$ and the public key $P_b$ in which the ID information $ID_b$ of the entity B is mapped onto the elliptic curve.

$$\begin{aligned} K_{ab} &= <S_a, P_b> \\ &= <rP_a, P_b> \\ &= <P_a, P_b>^r \end{aligned} \qquad (2)$$

On the other hand, if $ID_a > ID_b$ is set, the entity B generates a common key $K_{ba}$ in accordance with the following equation (3) by using the public key $P_a$ in which the ID information $ID_a$ of the entity A is mapped onto the elliptic curve and the self-secret key $S_b$.

$$\begin{aligned} K_{ba} &= <P_a, S_b> \\ &= <P_a, rP_b> \\ &= <P_a, P_b>^r \end{aligned} \qquad (3)$$

Accordingly, the common key $K_{ab}$ generated by the entity A is coincident with the common key $K_{ba}$ generated by the entity B so that the common key can be shared between both entities A and B.

Next, description will be given to two examples in which the key can be shared without setting the comparison in size of the ID information described above.

SECOND EXAMPLE

A symmetrical function g(x, y) related to x and y (excluding g(x, y)=xy) is set. In the following example, g(x, y)=x+y is set. The entity A generates a common key of $K_{ab}=k_{ab}+k_{ba}$ as in the following equation (4) in accordance with g (x, y)=x+y.

$$\begin{aligned} K_{ab} &= k_{ab} + k_{ba} \\ &= <S_a, P_b> + <P_b, S_a> \\ &= <rP_a, P_b> + <P_b, rP_a> \\ &= <P_a, P_b>^r + <P_b, P_a>^r \end{aligned} \qquad (4)$$

On the other hand, the entity B generates a common key of $K_{ba}=k_{ba}+k_{ab}$ as in the following equation (5) in accordance with g (x, y)=x+y.

$$\begin{aligned} K_{ba} &= k_{ba} + k_{ab} \\ &= <S_b, P_a> + <P_a, S_b> \\ &= <rP_b, P_a> + <P_a, rP_b> \\ &= <P_b, P_a>^r + <P_a, P_b>^r \end{aligned} \qquad (5)$$

Accordingly, the common key $K_{ab}$ generated by the entity A is coincident with the common key $K_{ba}$ generated by the entity B so that the common key can be shared between both entities A and B. Even if other kinds of symmetrical functions g(x, y) are utilized, the key can be shared in the same manner.

THIRD EXAMPLE

The entity A generates a common key of $K_{ab}=k_{ab}+k_{ab}^{-1}$ as in the following equation (6) by using the $k_{ab}$ shown in the second example.

$$\begin{aligned} K_{ab} &= k_{ab} + k_{ab^{-1}} \\ &= <S_a, P_b> + <S_a, P_b>^{-1} \\ &= <rP_a, P_b> + <rP_a, P_b>^{-1} \\ &= <P_a, P_b>^r + <P_a, P_b>^{-r} \end{aligned} \qquad (6)$$

The entity B generates a common key of $K_{ba}=k_{ba}+k_{ba}^{-1}$ as in the following equation (7) by using the $k_{ba}$ shown in the second example.

$$\begin{aligned} K_{ba} &= k_{ba} + k_{ba^{-1}} \\ &= <S_b, P_a> + <S_b, P_a>^{-1} \\ &= <rP_b, P_a> + <rP_b, P_a>^{-1} \\ &= <P_b, P_a>^r + <P_b, P_a>^{-r} \\ &= <P_a, P_b>^{-r} + <P_a, P_b>^{-r} \end{aligned} \qquad (7)$$

Accordingly, the common key $K_{ab}$ generated by the entity A is coincident with the common key $K_{ba}$ generated by the entity B so that the common key can be shared between both entities A and B.

FOURTH EXAMPLE

The entity A generates an intermediate key $I_{ab}$ in accordance with the following manner by using the self-secret key $S_a$ and the public key $P_b$ of the entity B.

$$\begin{aligned} I_{ab} &= <S_a, P_b> \\ &= <rP_a, P_b> \\ &= <P_a, P_b>^r \end{aligned}$$

The entity B generates an intermediate key $I_{ba}$ in accordance with the following manner by using the self-secret key $S_b$ and the public key $P_a$ of the entity A.

$$\begin{aligned} I_{ba} &= <S_b, P_a> \\ &= <rP_b, P_a> \\ &= <P_b, P_a>^r \end{aligned}$$

According to the above-mentioned (Commutative Law) in Weil pairing, it is understood that a relation of $I_{ab} \times I_{ba}=1$ is satisfied. The key may be shared between both entities A and B by utilizing such a relation of inverse number.

As described above, a common key for each entity can easily be generated by utilizing the Weil pairing.

While the mapping point $P_a$ is directly obtained from the ID information $ID_a$ of the entity A in th e above-mentioned example, the ID information $ID_a$ may be converted by utilizing a one-way function to obtain the mapping point $P_a$ from the converted value. In this case, if a hash function h( ) is used as an example of the one-way function, the public key $P_a=f(h(ID_a))$ and the secret key $S_a=r\cdot f(h(ID_a))$ are set.

In order for the entity to obtain the secret information r of the center 1 with difficulty, the following two conditions are required.

(condition 1) q is set to be $2^{160}$ or more.
(condition 2) There is an integer k which satisfies $\#E/F_q|q^k-1$ and $q^k>2^{1024}$.

The (condition 1) is required for solving an elliptic discrete logarithm problem with difficulty. The (condition 2) is required for solving the discrete logarithm problem of a finite field $F_d$ ($d=q^k$) with difficulty.

Figure 3:
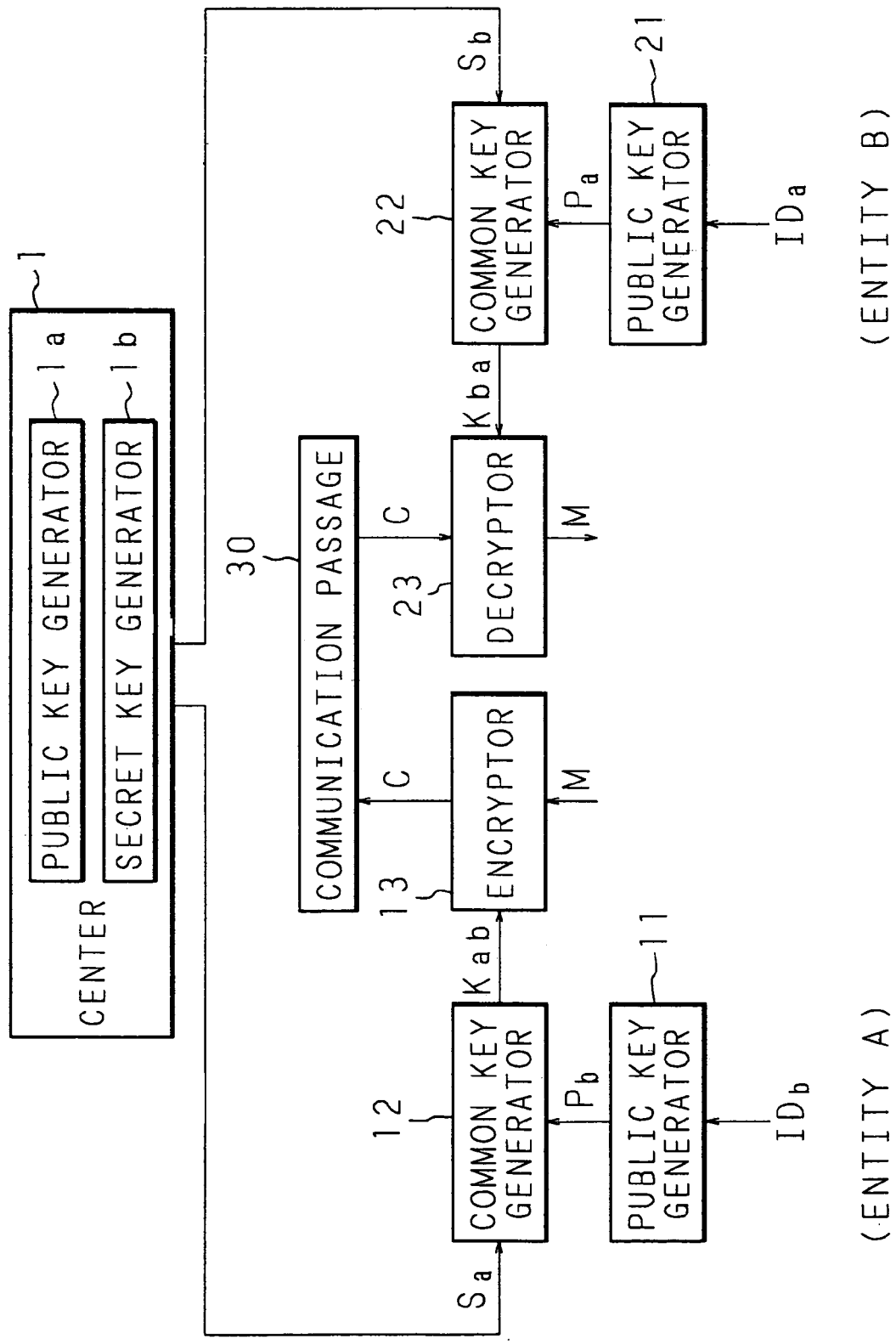
FIG. 3 is a diagram typically showing the communication state of information between two entities.

Next, description will be given to an information communication between the entities in a cryptosystem utilizing the above-mentioned key sharing method. FIG. 3 is a diagram typically showing the communication state of information between two entities A and B. In the example of FIG. 3, the entity A encrypts a plaintext (message) M into a ciphertext C and transmits the same to the entity B, and the entity B decrypts the ciphertext C to the original plaintext (message) M.

The center 1 comprises a public key generator 1a for using a function f( ) to obtain public keys $P_a$ and $P_b$ to be mapping positions in which the ID information $ID_a$ and $ID_b$ of the entities A and B are mapped on an elliptic curve, and a secret key generator 1b for obtaining secret keys $S_a$ and $S_b$ of the entities A and B by using the public keys $P_a$ and $P_b$ and center inherent secret information r. The secret keys $S_a$ and $S_b$ generated in accordance with the above-mentioned (1) are sent from the center 1 to the entities A and B.

The entity A side is provided with a public key generator 11 for inputting ID information $ID_b$ of the entity B to obtain the public key $P_b$ to be a mapping position in which the ID information $ID_b$ is mapped on the elliptic curve, a common key generator 12 for generating a common key $K_{ab}$ to the entity B which is required for the entity A based on the secret key $S_a$ sent from the center 1 and the public key $P_b$ from the public key generator 11, and an encryptor 13 for encrypting the plaintext (message) M into the ciphertext C by using the common key $K_{ab}$ and for outputting the ciphertext C to a communication passage 30.

Moreover, the entity B side is provided with a public key generator 21 for inputting ID information $ID_a$ of the entity A to obtain the public key $P_a$ to be a mapping position in which the ID information $ID_a$ is mapped on the elliptic curve, a common key generator 22 for generating a common key $K_{ba}$ to the entity A which is required for the entity B based on the secret key $S_b$ sent from the center 1 and the public key $P_a$ from the public key generator 21, and a decryptor 23 for decrypting the ciphertext C input from the communication passage 30 to the plaintext (message) M by using the common key $K_{ba}$ and for outputting the plaintext M.

Next, operation will be described. In the case in which information is to be transmitted from the entity A to the entity B, the ID information $ID_b$ of the entity B is first input to the public key generator 11 to obtain the public key $P_b$. Then, the public key $P_b$ thus obtained is sent to the common key generator 12. Moreover, the secret key $S_a$ is input from the center 1 to the common key generator 12. Then, the common key $K_{ab}$ is obtained in accordance with the above-mentioned equation (2), (4) or (6), and is sent to the encryptor 13. In the encryptor 13, the plaintext (message) M is encrypted into the ciphertext C by using the common key $K_{ab}$ and the ciphertext C is transmitted through the communication passage 30.

The ciphertext C transmitted through the communication passage 30 is input to the decryptor 23 of the entity B. The ID information $ID_a$ of the entity A is input to the public key generator 21 so that the public key $P_a$ is obtained. The public key $P_a$ thus obtained is sent to the common key generator 22. Moreover, the secret key $S_b$ is input from the center 1 to the common key generator 22. Then, the common key $K_{ba}$ is obtained in accordance with the above-mentioned equation (3), (5) or (7) and is sent to the decryptor 23. In the decryptor 23, the ciphertext C is decrypted to the plaintext (message) M by using the common key $K_{ba}$.

Next, safety according to the present invention will be described. The safety of the present invention is based on an elliptic curve discrete logarithm problem and an extended elliptic curve discrete logarithm problem equivalent thereto as will be described below.

[Equivalence of Elliptic Discrete Logarithm Problem to Extended Elliptic Discrete Logarithm Problem]

An ordinary elliptic discrete logarithm problem implies a problem in which r is obtained from P and Q when an optional point P on an elliptic curve E and an r-fold point Q=rP are given. As shown in the following equation (8), in the case in which an optional point $P_i(1 \leq i \leq n-1)$ and Q based on the point $P_i$ are given to the elliptic curve, a problem for obtaining a certain set of $r_i(1 \leq i \leq n-1)$ is defined as the extended elliptic discrete logarithm problem. There will be considered the equivalence of the elliptic discrete logarithm problem to the extended elliptic discrete logarithm problem. For simplicity of discussion, the elliptic curve is a prime number order p.

$$P_i, Q\left(=\sum_{i=1}^{n-1} r_i P_i\right) \to r_i (1 \leq \forall_i \leq n-1) \quad (8)$$

(Conclusion of Elliptic Discrete Logarithm Problem into Extended Elliptic Discrete Logarithm Problem)

It is assumed that the elliptic discrete logarithm problem can be solved on the basis of a base point P. Referring to $P_i$ ($1 \leq i \leq n-1$) and Q, coefficients can be obtained on the basis of the base point P on the elliptic curve as shown in the following equation (9), respectively.

$$P_i \to r_i'^{provided} P_i = r_i' P (1 \leq \forall_i \leq n-1) \quad (9)$$
$$\sum_{i=1}^{n-1} r_i P_i \to r'_{provided} \sum_{i=1}^{n-1} r_i P_i = r' P$$

Coefficients $r_i'$ and $r'$ are set to be elements of $F_p$ and the following indefinite equation (10) is solved. Thus, $r_i(1 \leq i \leq n-1)$ can be obtained. Consequently, the extended elliptic discrete logarithm problem can be solved.

$$r' = \sum_{i=1}^{n-1} r_i r_i' \quad (10)$$

(Conclusion of Extended Elliptic Discrete Logarithm Problem into Elliptic Discrete Logarithm Problem)

It is assumed that an optional extended elliptic discrete logarithm problem can be solved. Referring to $P_i(1 \leq i \leq n)$ on the elliptic curve, an extended elliptic discrete logarithm problem indicated by the following equation (11) is solved and is expressed in a matrix. Consequently, the following equation (12) can be obtained.

$$P_i = \sum_{\substack{j=1 \\ j \neq i}}^{n} r_{i,j} P_j (1 \leq i \leq n) \quad (11)$$

$$\begin{pmatrix} r_{1,1}P_1 & r_{1,2}P_2 & \ldots & r_{1,n-1}P_{n-1} & -P_n \\ r_{2,1}P_1 & r_{2,2}P_2 & \ldots & -P_{n-1} & r_{2,n}P_n \\ \vdots & \vdots & \vdots & \vdots \\ -P_1 & r_{n,2}P_2 & \ldots & r_{n,n-1}P_{n-1} & r_{n,n}P_n \end{pmatrix} = \begin{pmatrix} 0 \\ 0 \\ \vdots \\ 0 \end{pmatrix} \quad (12)$$

When only coefficients are extracted from the matrix in the above-mentioned equation (12), the following equation (13) is obtained and modification can be carried out as indicated by the following equation (14).

$$\begin{pmatrix} r_{1,1} & r_{1,2} & \ldots & r_{1,n-1} & -1 \\ r_{2,1} & r_{2,2} & \ldots & -1 & r_{2,n} \\ \vdots & \vdots & \vdots & \vdots \\ -1 & r_{n,2} & \ldots & r_{n,n-1} & r_{n,n} \end{pmatrix} \equiv \begin{pmatrix} 0 \\ 0 \\ \vdots \\ 0 \end{pmatrix} (\bmod p) \quad (13)$$

$$\begin{pmatrix} -1 & 0 & \ldots & 0 & r_1' \\ 0 & -1 & \ldots & 0 & r_2' \\ \vdots & \vdots & & \vdots & \vdots \\ 0 & 0 & \ldots & -1 & r_{n-1}' \\ 0 & 0 & \ldots & 0 & 0 \end{pmatrix} \equiv \begin{pmatrix} 0 \\ 0 \\ \vdots \\ 0 \end{pmatrix} (\bmod p) \quad (14)$$

As is apparent from the equation (14), the point $P_i(1 \leq i \leq n-1)$ can be expressed in the constant multiple of $P_n$. In other words, $r_i'$ satisfying $P_i = r_i' P_n$ can be obtained by solving the extended elliptic discrete logarithm problem.

Consequently, the elliptic discrete logarithm problem is equivalent to the extended elliptic discrete logarithm problem.

[Safety Related to Secret Information of Center]

The secret information r of the center is obtained from the public key $P_c$ and the secret key $S_c$ of an entity C equivalently to the solution of the elliptic discrete logarithm problem with difficulty.

$<P_a, P_b>$ is calculated from the public key $P_a$ of the entity A and the public key $P_b$ Of the entity B and r is obtained from the calculated $<P_a, P_b>$ and the common key $K_{ab} = <P_a, P_b>^r$ equivalently to the solution of the discrete logarithm problem with difficulty.

Accordingly, any entity cannot obtain the secret information r of the center.

[Safety related to Secret Key of Entity]

An attack in which n entities colluding each other counterfeit the secret key $S_c$ of the entity C will be considered. If it is assumed that the public key $P_c$ of the entity C can be expressed by linear combination of the public keys of other entities as in the following equation (15), the following equation (16) is established if the linear combination is substituted for the equation (1). Therefore, the secret key $S_c$ of the entity C is exposed.

$$P_c = u_1 P_1 + u_2 P_2 + \ldots + u_n P_n \quad (15)$$

$$\begin{aligned} S_c &= r P_c \\ &= r(u_1 P_1 + u_2 P_2 + \ldots + u_n P_n) \\ &= u_1(r P_1) + u_2(r P_2) + \ldots + u_n(r P_n) \\ &= u_1 S_1 + u_2 S_2 + \ldots + u_n S_n \end{aligned} \quad (16)$$

However, it is necessary to solve the following extended elliptic curve discrete logarithm problem to obtain the coefficient $u_i$ in the equation (15). Accordingly, such an attack is hard to perform. Consequently, the safety is based on the difficulty of the solution of the extended elliptic discrete logarithm problem.

The safety of the secret key will be described in more detail. The extended elliptic discrete logarithm problem implies a problem for solving the coefficients $u_1$ and $u_2$ in the following equation (17) when P is an optional point on $E/F_q$ and $(G_1, G_2)$ is a generator of $E/F_q$.

$$P = u_1 G_1 + u_2 G_2 \quad (17)$$

The degrees of $G_1$ and $G_2$ are defined as $\#(G_1)$ and $\#(G_2)$. $\#(G_1) | \#(G_2)$ is set. If the extended elliptic discrete logarithm problem can be solved, the coefficients $u_1$ and $u_2$ in $P = u_1 G_1 + u_2 G_2$ and the coefficients $v_1$ and $V_2$ in $Q = v_1 G_1 + v_2 G_2$ are obtained. Consequently, the elliptic discrete logarithm problem Q=rP can be solved in the following equation (18).

$$ru_1 \equiv v_1 (\bmod \#(G_1))$$
$$ru_2 \equiv v_2 (\bmod \#(G_2))$$
$$r \equiv \frac{V_1}{U_1}\left(\bmod \frac{\#(G_1)}{gcd(u_1, \#(G_1))}\right)$$
$$r \equiv \frac{V_2}{U_2}\left(\bmod \frac{\#(G_2)}{gcd(u_2, \#(G_2))}\right)$$
(18)

Equivalency of the problem for solving the equation (15) to the extended elliptic discrete logarithm problem will be considered. If the equation (15) can be solved, $r_{ij}$ in the following equation (19) can be obtained.

$$P_i = \sum_{\substack{j=1 \\ j \neq i}}^{n} r_{i,j} P_j \, (1 \leq i \leq n-2)$$
(19)

On the assumption that a determinant of $(n-2)\times(n-2)$ on the left side is a prime of $\#(G_2)$ of $P_{n-1}=G_l$ and $P_n=G_2$ in the following equation (20), the following equation (20) can be solved. If the determinant is not a prime of $\#(G_2)$, another solution $r_{i,j}$ in the equation (19) can be selected.

$$\begin{pmatrix} -1 & r_{1,2} & \cdots & r_{1,n-2} \\ r_{2,1} & -1 & \cdots & -r_{2,n-2} \\ \vdots & \vdots & & \vdots \\ r_{n-2,1} & r_{n-2,2} & \cdots & -1 \end{pmatrix} \begin{pmatrix} P_1 \\ P_2 \\ \vdots \\ P_{n-2} \end{pmatrix} = - \begin{pmatrix} r_{1,n-1} & r_{1,n} \\ r_{2,n-1} & r_{2,n} \\ \vdots & \vdots \\ r_{n-2,n-1} & r_{n-2,n} \end{pmatrix} \begin{pmatrix} P_{n-1} \\ P_n \end{pmatrix}$$
(20)

As a result, if the equation (15) can be solved, the extended elliptic discrete logarithm problem of $P_i$ shown in the following equation (21) and $(G_1, G_2)$ can also be solved.

$$\begin{pmatrix} P_1 \\ P_2 \\ \vdots \\ P_{n-2} \end{pmatrix} = \begin{pmatrix} r'_{1,n-1} & r'_{1,n} \\ r'_{2,n-1} & r'_{2,n} \\ \vdots & \vdots \\ r'_{n-2,n-1} & r'_{n-2,n} \end{pmatrix} \begin{pmatrix} P_{n-1} \\ P_n \end{pmatrix}$$
(21)

To the contrary, if the extended elliptic discrete logarithm problem can be solved, it is indicated that the equation (15) can be solved. If the extended elliptic discrete logarithm problem of $P_i$ and $(G_1, G_2)$ is defined as the following equation (22) and the extended elliptic discrete logarithm problem of $P_c$ and $(G_1, G_2)$ is defined as the following equation (23), a relationship in the following equation (24) is established.

$$\begin{pmatrix} P_1 \\ P_2 \\ \vdots \\ P_n \end{pmatrix} = \begin{pmatrix} r_{1,1} & r_{1,2} \\ r_{2,1} & r_{2,2} \\ \vdots & \vdots \\ r_{n,1} & r_{n,2} \end{pmatrix} \begin{pmatrix} G_1 \\ G_2 \end{pmatrix}$$
(22)

$$Pc = v_1 G_1 + v_2 G_2$$
(23)

$$\left. \begin{aligned} v_1 G_1 + v_2 G_2 &= \sum_{i=1}^{n} u_i r_{i,1} G_1 + \sum_{i=1}^{n} u_i r_{i,2} G_2 \\ v_1 &= \sum_{i=1}^{n} u_i r_{i,1} \\ v_2 &= \sum_{i=1}^{n} u_i r_{i,2} \end{aligned} \right\}$$
(24)

If $V_j$ and $r_{ij}$ are given, it is apparent that $u_i$ can be solved. Accordingly, the problem for solving the above equation (15) is equivalent to the extended elliptic discrete logarithm problem. Moreover, if a group of elliptic curves is cyclic, it is apparent that the extended elliptic discrete logarithm problem is equivalent to the elliptic discrete logarithm problem. In this case, accordingly, the problem for solving the above equation (15) is equivalent to the elliptic discrete logarithm problem.

[Safety Related to Common Key Between Entities]

An attack in which n entities colluding each other counterfeit the common key between the entities A and C will be considered. If it is assumed that the public key $P_C$ of the entity C can be expressed by linear combination of the public keys of other entities as in the above equation (15), common keys $K_{ac}$ and $K_{ca}$ between both entities A and C are exposed as in the following equations (25) and (26), and so is the case in which the secret key $S_c$ of the entity C can be expressed by the linear combination.

*rework*

$$\begin{aligned} K_{ac} &= \langle S_a, P_c \rangle \\ &= \langle S_a, u_1 P_1 + u_2 P_2 + \ldots + u_n P_n \rangle \\ &= \langle S_a, P_1 \rangle^{u_1} \langle S_a, P_2 \rangle^{u_2} \ldots \langle S_a, P_n \rangle^{u_n} \\ &= K_{a1}^{u_1} K_{a2}^{u_2} \ldots K_{an}^{u_n} \end{aligned}$$
(25)

$$K_{ca} = K_{1a}^{-u_1} K_{2a}^{-u_2} \ldots K_{na}^{-u_n}$$
(26)

However, it is necessary to solve the extended elliptic discrete logarithm problem to obtain the coefficient $u_i$ in the above equation (15). Accordingly, such an attack is hard to perform.

The entity A cannot counterfeit a common key $K_{bc}$ between other entities from the self-public key $P_a$ and self-secret key $S_a$ if any. The reason is that the secret keys $S_b$ and $S_c$ are secret information about the entities B and C which cannot be obtained if there is no secret information r. Accordingly, any entity cannot counterfeit the common key $K_{bc}$.

A collusion attack for obtaining the common key $K_{bc}$ from the secret key $S_i$ of a collusive entity I without the secret keys $S_b$ and $S_c$ has the same problem as that in the case in which the secret keys $S_b$ and $S_c$ are obtained from the secret key $S_i$. Moreover, the collusion attack for obtaining the common key $K_{bc}$ from the common key $K_{ij}$ between the collusive entities I and J is a difficult problem because the secret information r of the center is not known. The problem for obtaining the common key $K_{bc}$ results in a Diffe-Hellman type problem.

The entity A can calculate the common keys $K_{ab}$ and $K_{ac}$. Therefore, if the common key $K_{bc}$ can be obtained from the common keys $K_{ab}$ and $K_{ac}$, the entity A can counterfeit a common key between other entities. However, it is hard to apply such an attack method to the present invention.

Next, description will be given to a key sharing method for extending ID information of each entity to a vector according to another embodiment of the present invention.

A vector $P_a$ to be the ID information of an entity A is represented by the following equation (27).

$$\text{Vector } P_a = (P_{a1}, P_{a2}, \ldots, P_{an}) \tag{27}$$

Moreover, a symmetrical matrix R of n×n is set as the secret information of a center 1 in the following equation (28).

$$R = R^t \tag{28}$$

$$= \begin{pmatrix} r_{11} & r_{12} & \cdots & r_{1n} \\ r_{21} & r_{22} & \cdots & r_{2n} \\ \vdots & \vdots & & \vdots \\ r_{n1} & r_{n2} & \cdots & r_{nn} \end{pmatrix}$$

In the center 1, the vector $P_a$ and the symmetrical matrix R are used to obtain a secret key (vector $S_a$) of the entity A in accordance with the following equation (29), and the secret key thus obtained is sent to the entity A in secret.

$$\vec{S_a} = \vec{P_a} R \tag{29}$$

The entity A generates a common key $K_{ab}$ to an entity B in accordance with the following equation (30). A product of points is set to be a value of Weil pairing.

$$K_{ab} = \vec{S_a} \vec{P_b}^t \tag{30}$$

$$= \vec{P_a} R \vec{P_b}^t$$

$$= (P_{a1} P_{a2} \cdots P_{an}) \begin{pmatrix} r_{11} & r_{12} & \cdots & r_{1n} \\ r_{21} & r_{22} & \cdots & r_{2n} \\ \vdots & \vdots & & \vdots \\ r_{n1} & r_{n2} & \cdots & r_{nn} \end{pmatrix} \begin{pmatrix} P_{b1} \\ P_{b2} \\ \vdots \\ P_{bn} \end{pmatrix}$$

$$= \left( \sum_{i=1}^{n} r_{i1} P_{ai} \sum_{i=1}^{n} r_{i2} P_{ai} \cdots \sum_{i=1}^{n} r_{in} P_{ai} \right) \begin{pmatrix} P_{b1} \\ P_{b2} \\ \vdots \\ P_{bn} \end{pmatrix}$$

$$= \prod_{j=1}^{n} \left\langle \sum_{i=1}^{n} r_{ij} P_{ai}, P_{bj} \right\rangle$$

$$= \prod_{j=1}^{n} \prod_{i=1}^{n} \langle P_{ai}, P_{bj} \rangle^{r_{ij}}$$

*rework*

Moreover, the entity B generates a common key $K_{ba}$ to the entity A in the same manner. In the case in which the comparative relationship in size between the ID information of the entities A and B is taken into consideration as in the first example according to the above mentioned embodiment, $K_{ab} = K_{ba}$ is set so that the same common key can be shared.

Next, safety according to the present embodiment will be taken into consideration.

[Safety related to Secret Information of Center]

A secret matrix R of the center is obtained from the public key vector $P_c$ and the secret key vector $S_c$ of an entity C equivalently to the solution of the extended elliptic discrete logarithm problem with difficulty.

$\langle P_{ai}, P_{bj} \rangle$ ($1 \leq i, j \leq n$) is calculated from the public key vector $P_a$ of the entity A and the public key vector $P_b$ of the entity B and each component $r_{ij}$ ($1 \leq i, j \leq n$) of the matrix R is obtained from the calculated $\langle P_{ai}, P_{bj} \rangle$ and the common key $K_{ab}$ shown in the following equation (31) equivalently to the extended discrete logarithm problem and the discrete logarithm problem in the same manner as the equivalence of the extended elliptic discrete logarithm problem to the elliptic discrete logarithm problem.

$$K_{ab} = \prod_{j=1}^{n} \prod_{i=1}^{n} \langle P_{ai}, P_{bj} \rangle^{r_{ij}} \tag{31}$$

As described above, the secret information (symmetrical matrix R) of the center 1 is not exposed.

[Safety Related to Secret Key of Entity]

An attack in which n entities colluding each other counterfeit the secret key vector $S_c$ of the entity C will be considered. If it is assumed that the public key vector $P_c$ of the entity C can be expressed by linear combination of the public key vectors of other entities as in the following equation (32), the following equation (33) is established if the linear combination is substituted for the above equation (29). Therefore, the secret key vector SC of the entity C is exposed.

$$\vec{P_c} = u_1 \vec{P_1} + u_2 \vec{P_2} + \ldots + u_n \vec{P_n} \tag{32}$$

$$\vec{S_c} = \vec{P_c} R \tag{33}$$

$$= (u_1 \vec{P_1} + u_2 \vec{P_2} + \ldots + u_n \vec{P_n}) R$$

$$= u_1 (\vec{P_1} R) + u_2 (\vec{P_2} R) + \ldots + u_n (\vec{P_n} R)$$

$$= u_1 \vec{S_1} + u_2 \vec{S_2} + \ldots + u_n \vec{S_n}$$

However, it is necessary to solve the extended elliptic discrete logarithmic problem to obtain components in the above equation (29). Therefore, such an attack is carried out with difficulty. Accordingly, the safety is based on the difficulty to solve the extended elliptic discrete logarithm problem.

[Safety Related to Common Key Between Entities]

An attack in which n entities colluding each other counterfeit a common key between the entities A and C will be considered. If it is assumed that the public key vector $P_c$ of the entity C can be expressed by linear combination of the public key vectors of other entities as in the following equation (32), common keys $K_{ac}$ and $K_{ca}$ between both entities A and C are exposed as in the following equations (34) and (35), and so is the case in which the secret key vector $S_c$ of the entity C can be expressed by the linear combination.

$$K_{ac} = \vec{S_a} \vec{P_c} \quad (34)$$
$$= \vec{S_a}(u_1\vec{P_1} + u_2\vec{P_2} + \ldots + u_n\vec{P_n})$$
$$= (\vec{S_a} \vec{P_1})^{u_1} (\vec{S_a} \vec{P_2})^{u_2} \ldots (\vec{S_a} \vec{P_n})^{u_n}$$
$$= K_{a1}^{u_1} K_{a2}^{u_2} \ldots K_{an}^{u_n}$$
$$K_{ca} = K_{1a}^{-u_1} K_{2a}^{-u_2} \ldots K_{na}^{-u_n} \quad (35)$$

However, the extended elliptic discrete logarithm problem is solved to obtain the coefficient $u_i$ in the above equation (32). Therefore, such an attack is hard to perform.

Also in the present embodiment, moreover, it is hard to generate a common key between other entities from a self-common key by a certain entity in the same manner as that in the above-mentioned embodiment.

It is also possible to extend the ID information of the entity to a symmetrical matrix of n×n. In this case, the relationship in the following equation (36) is satisfied by a common key matrix $k_{ab}=(s_{ij})$ and a common key matrix $k_{ba}=(t_{ji})$.

$$s_{ij}=t_{ji}^{-1} \quad (36)$$

While the case in which the Weil pairing is used has been described in the above example, the key sharing can be carried out between both entities also in the case in which Tate pairing is utilized as pairing on the elliptic curve.

Moreover, in any of the Weil pairing and the Tate pairing, the calculation of the pairing can be extended such that coordinates on points P and Q belong to different fields in pairing <P,Q> when the key sharing is to be carried out. Moreover, if the coordinates on the point P are defined by a small field, the calculation of the pairing can be carried out at a high speed.

A change in a definition field of the elliptic curve is advantageous in that the common key cannot reliably be 1 and the calculation can be carried out at a high speed. In the case in which the definition field of the elliptic curve is to be changed, that is, two kinds of definition fields are used, two ways of corresponding to the public key are required. In the conventional ID-NIKS, the entity carries out the key sharing by using one public key determined by ID information and a self-secret key. In this method, the public key is mapped at a point on the same elliptic curve having different definition fields based on the ID information by two different methods, according to ID information or a public key, one of the entities uses the public key utilizing one of the definition fields and the other entity uses the public key utilizing the other definition field. Thus, the key sharing is carried out.

All the entities are divided into two groups $G_1$ and $G_2$. The entity belonging to the group $G_1$ uses elements of a group including P as the ID information and the entity belonging to the group $G_2$ uses elements of a group including Q as the ID information. Consequently, the entity of the group $G_1$ and that of the group $G_2$ can share a key.

Each entity has two kinds of ID information, and an algorithm indicative of some relationship in size is set to each ID information of the entity A and the entity B and any ID information to be used by one of the entities A and B is determined. Consequently, the key can be shared.

Each entity has two kinds of ID information, and two kinds of values are calculated between both entities and two calculated values thus obtained are added to each other. Thus, an operation to obtain the same value is used to generate a common key.

By properly determining conversion between the elements of the group including P and those of the group including Q and using the conversion as system inherent public information, the key can be shared.

While the case in which the elliptic curve is used as the algebraic curve has been described in the above example, the hyperelliptic discrete logarithm problem and the pairing can be defined even if the hyperelliptic curve is used. Therefore, extension can easily be carried out.

Figure 4:
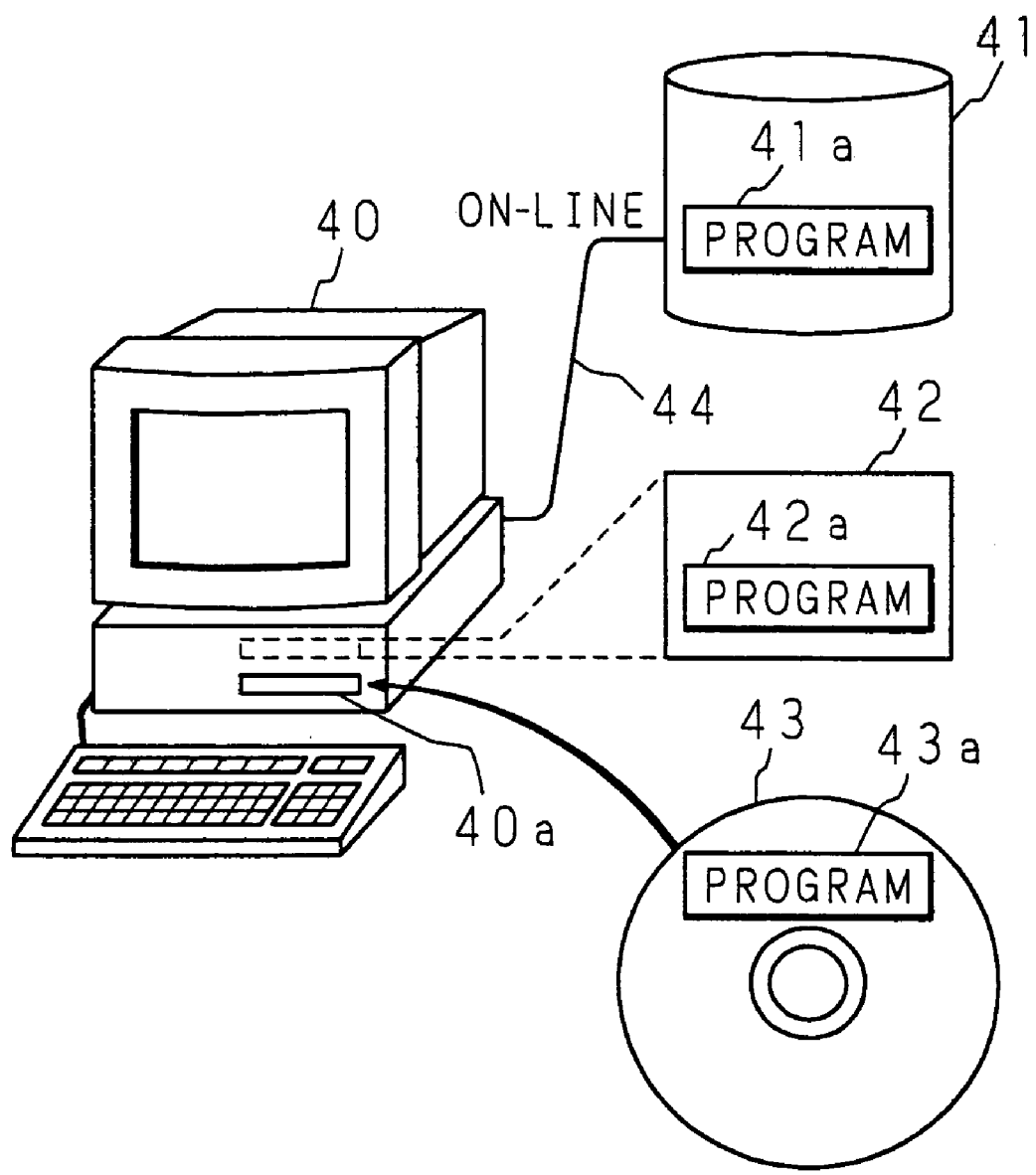
FIG. 4 is a diagram showing the structure of a memory product according to an embodiment.

FIG. 4 is a diagram showing the structure of a memory product according to an embodiment of the present invention. An illustrated program includes a processing of generating a secret key of each entity by the above-mentioned method based on the ID information of each entity and the center inherent secret information (a step of mapping at a point on an elliptic curve based on the ID information of the entity to obtain a mapping value and a step of generating the secret key by using the mapping value and the center inherent secret information) or a processing of generating a common key by the above-mentioned method based on the secret key of the entity itself and the public key of the entity to be a communication party (a step of mapping at a point on an elliptic curve based on the ID information of the entity to be a communication party, thereby obtaining a mapping value and a step of generating the common key by using the mapping value and the secret key of the entity itself), which is recorded in the memory product to be described below. A computer 40 is provided on the center 1 side or each entity side.

In FIG. 4, a memory product 41 which is on-line connected to the computer 40 is formed by using a WWW (World Wide Web) server computer provided apart from a place where the computer 40 is installed, for example. The memory product 41 records a program 41a described above. The program 41a read from the memory product 41 through a transmission medium 44 such as a communication line controls the computer 40, thereby generating a secret key of each entity or generating a common key between both entities.

A memory product 42 provided in the computer 40 is formed by using a hard disk drive, an ROM or the like provided therein, for example, and records a program 42a described above. The program 42a read from the memory product 42 controls the computer 40, thereby generating a secret key of each entity or generating a common key between both entities.

A memory product 43 to be attached to a disk drive 40a provided in the computer 40 is formed by using an optical magnetic disk, a CD-ROM, a flexible disk or the like which can be carried, for example, and records a program 43a described above. The program 43a read from the memory product 43 controls the computer 40, thereby generating a secret key of each entity or generating a common key between both entities.

As described above in detail, in the present invention, the public key generated from the ID information of each entity is mapped on the algebraic curve such as an elliptic curve. Therefore, it is possible to easily share the common key between both entities without carrying out a preliminary communication. In the present invention, moreover, the safety is based on the discrete logarithm problem on the algebraic curve, and the present invention has a resistance to an attack such as a collusion attack and can contribute to the development of the ID-NIKS.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A cryptographic communication method for communicating information through a ciphertext between entities, comprising the steps of:
    generating a secret key of each entity by using mapping at a point on an algebraic curve based on identity information of each entity and secret information;
    generating at a first entity a first common key by using the secret key of the first entity and a public key obtained by mapping at a point on the algebraic curve based on identity information of a second entity;
    encrypting at the first entity a plaintext into a ciphertext by using the generated first common key and transmitting the ciphertext to the second entity;
    generating at the second entity the same second common key as the first common key by using the secret key of the second entity and a public key obtained by mapping at a point on the algebraic curve based on identity information of the first entity; and
    decrypting at the second entity the transmitted ciphertext into a plaintext by using the generated second common key.

2. A method for generating a common key between a first entity and a second entity, comprising the steps of:
    generating a secret key of the first entity by using mapping at a point on an algebraic curve based on identity information of the first entity and secret information;
    generating a public key of the second entity by using mapping at a point on the algebraic curve based on identity information of the second entity; and
    generating a common key between both entities by using the secret key and public key thus generated.

3. The common key generating method according to claim 2, wherein the common key is generated by using pairing defined on the algebraic curve.

4. A method for sharing a key without a preliminary communication between entities, comprising the steps of:
    obtaining a secret key of a first entity, the secret key being generated by using mapping at a point on an algebraic curve based on identity information of the first entity and secret information;
    obtaining a public key of a second entity, the public key being obtained by mapping at a point on an algebraic curve based on identity information of the second entity; and
    generating a common key between the first entity and the second entity by using the secret key and the public key.

5. The key sharing method according to claim 4, wherein key sharing is carried out between the first entity and the second entity by utilizing magnitude relations between mapping at a point on an algebraic curve based on identity information of the first entity and mapping at a point on the algebraic curve based on identity information of the second entity.

6. The key sharing method according to claim 4, wherein key sharing is carried out between the first entity and the second entity by utilizing a symmetrical function.

7. The key sharing method according to claim 4, wherein the algebraic curve is an algebraic curve in which a discrete logarithm problem defined thereon cannot be solved in a polynomial time.

8. The key sharing method according to claim 4, wherein numeric values which are inverse to each other are generated in a process of an operation in respective entities when sharing the key between the first entity and the second entity.

9. A method for generating a common key based on the key sharing method according to claim 8 wherein the common key is generated by utilizing a relationship of inverse between the numeric values.

10. The key sharing method according to claim 4, wherein a plurality of public keys are generated based on the identity information of each entity.

11. A method for sharing a key without a preliminary communication between both entities based on respective identity information of the entities, wherein the key sharing is carried out by utilizing a bilinear mapping property of pairing defined on an algebraic curve is used.

12. The key sharing method according to claim 11, wherein the pairing is Weil pairing or Tate pairing.

13. A method for sharing a key without a preliminary communication between a first entity and a second entity based on respective identity information of the entities, wherein a bilinear mapping property of pairing defined on an algebraic curve is used to share a key by utilizing a secret key generated by using mapping at a point on the algebraic curve based on the identity information of the first entity and secret information and a public key obtained by mapping at a point on the algebraic curve based on the identity information of the second entity.

14. A method for generating a secret key of an entity based on identity information of the entity, wherein the secret key is generated by using mapping at a point on an algebraic curve based on the identity information of the entity and secret information.

15. The method for generating a secret key according to claim 14, wherein the secret key is generated by multiplying a result of mapping at a point on an algebraic curve based on the identity information of the entity by the secret information composed of an integer.

16. A method for generating a secret key of an entity based on identity information of the entity, wherein the secret key is generated by using mapping at a point on an algebraic curve based on a value obtained by causing a one-way function to act on the identity information of the entity and secret information.

17. A secret key generating device for generating a secret key of an entity based on identity information of the entity, comprising:
    a controller capable of performing the following operations;
    (i) obtaining a mapping value by mapping at a point on an algebraic curve based on the identity information of the entity; and
    (ii) generating the secret key by using the mapping value and secret information.

18. A common key generating device for generating a common key from a secret key based on identity information of a first entity and a public key based on identity information of a second entity to be a communication partner, comprising:
    a controller capable of performing the following operations;
    (i) obtaining a mapping value as the public key by mapping at a point on an algebraic curve based on the identity information of the second entity; and
    (ii) generating a common key by using the mapping value and the secret key.

19. A cryptographic communication system for permitting a plurality of entities to mutually perform an encrypting process for encrypting into a ciphertext information of a plaintext to be transmitted and a decrypting process for decrypting the transmitted ciphertext into a plaintext, comprising:
- a center generating a secret key of each entity by using mapping at a point on an algebraic curve based on identity information of each entity and self-secret information and sending the secret key to each entity; and
- a plurality of entities generating a common key to be used for the encrypting process and the decrypting process by using the self-secret key sent from said center and a public key obtained by mapping at a point on an algebraic curve based on identity information of an entity to be communicated.

20. A computer memory product having computer readable program code means for causing a computer to generate a secret key of an entity, said computer readable program code means comprising:
- program code means for causing the computer to obtain a mapping value as a public key by mapping at a point on an algebraic curve based on identity information of the entity; and
- program code means for causing the computer to generate the secret key by using the mapping value and secret information.

21. A computer memory product having computer readable program code means for causing a computer to generate, on a first entity side, a common key to be used for an encrypting process from a plaintext to a ciphertext and a decrypting process from the ciphertext to the plaintext, in an cryptographic communication system said computer readable program code means comprising:
- program code means for causing the computer to input a secret key of the first entity;
- program code means for causing the computer to obtain a mapping value as a public key by mapping at a point on an algebraic curve based on identity information of a second entity to be a communication partner; and
- program code means for causing the computer to generate the common key by using the mapping value and the input secret key.

22. A computer data signal embodied in a carrier wave for transmitting a program, the program being configured to cause a computer to generate a secret key of an entity, comprising:
- a code segment for causing the computer to obtain a mapping value as a public key by mapping at a point on an algebraic curve based on identity information of the entity; and
- a code segment for causing the computer to generate the secret key by using the mapping value and secret information.

23. A computer data signal embodied in a carrier wave for transmitting a program, the program being configured to cause a computer to generate, on a first entity side, a common key to be used for an encrypting process from a plaintext to a ciphertext and a decrypting process from the ciphertext to the plaintext in an cryptographic communication system, comprising:
- a code segment for causing the computer to input a secret key of the first entity;
- a code segment for causing the computer to obtain a mapping value as a public key by mapping at a point on an algebraic curve based on identity information of a second entity to be a communication partner; and
- a code segment for causing the computer to generate the common key by using the mapping value and the input secret key.

* * * * *